(12) United States Patent
Wurtenberger et al.

(10) Patent No.: US 9,036,503 B1
(45) Date of Patent: May 19, 2015

(54) INTERBAND TRAFFIC MANAGEMENT IN A MULTI-BAND WIRELESS NETWORK

(75) Inventors: Andrew Mark Wurtenberger, Olathe, KS (US); Bryan Timothy Barbee, Olathe, KS (US); Clark Douglas Halferty, Lee's Summit, MO (US); Caleb S. Hyde, Kansas City, MO (US)

(73) Assignee: Sprint Communications Company L.P., Overland Park, KS (US)

( * ) Notice: Subject to any disclaimer, the term of this patent is extended or adjusted under 35 U.S.C. 154(b) by 696 days.

(21) Appl. No.: 13/168,568

(22) Filed: Jun. 24, 2011

(51) Int. Cl.
| | |
|---|---|
| *G01R 31/08* | (2006.01) |
| *G06F 11/00* | (2006.01) |
| *G08C 15/00* | (2006.01) |
| *H04J 1/16* | (2006.01) |
| *H04J 3/14* | (2006.01) |
| *H04L 1/00* | (2006.01) |
| *H04L 12/26* | (2006.01) |
| *H04J 3/00* | (2006.01) |
| *H04W 4/00* | (2009.01) |

(52) U.S. Cl.
CPC .................. *H04L 12/2663* (2013.01)

(58) Field of Classification Search
USPC .......................................... 370/253, 331, 338
See application file for complete search history.

(56) References Cited

U.S. PATENT DOCUMENTS

| | | |
|---|---|---|
| 5,953,661 A | 9/1999 | Schwinghammer et al. |
| 6,690,938 B1 | 2/2004 | Chin |
| 2005/0272438 A1 | 12/2005 | Holur et al. |
| 2006/0073827 A1 * | 4/2006 | Vaisanen et al. ............... 455/436 |
| 2006/0166677 A1 | 7/2006 | Derakshan et al. |
| 2007/0104142 A1 * | 5/2007 | Kim ............................. 370/331 |
| 2008/0056190 A1 * | 3/2008 | Kim ............................. 370/331 |

\* cited by examiner

*Primary Examiner* — Melanie Jagannathan
*Assistant Examiner* — Stephanie Chang

(57) ABSTRACT

A wireless control system for managing traffic in a multi-band wireless network is disclosed. The wireless control system configured to receive measurements that indicate channel performance information and round trip delay information for wireless communication devices operating within a first frequency band of the multi-band wireless network, process the channel performance information and the round trip delay information to determine a probability of successful frequency transfer, identify a subset of the wireless communication devices with probabilities of successful transfer that exceed a transfer threshold, and remove from the subset wireless communication devices whose velocity exceeds a movement threshold. The wireless control system also receives loading information for the first frequency band, processes the loading information to determine if the loading information exceeds an offload threshold, and if so then identifies a first wireless communication device from the modified subset of the plurality of wireless communication devices and transfers an instruction to modify an operating frequency of the first wireless communication device from the first frequency band to the second frequency band.

15 Claims, 7 Drawing Sheets

INTERBAND TRAFFIC MANAGEMENT IN A MULTI-BAND WIRELESS NETWORK

TECHNICAL BACKGROUND

Wireless communications have become increasingly prominent for sending and receiving data information. For example, individuals may utilize a wireless communication device for voice communications, research, entertainment, or for conducting critical business transactions over a data network. Use of these services requires access to wireless voice and data networks.

Wireless communication providers may have multiple spectrum holdings at multiple frequency bands each of which support one or more voice and/or data networks. For example, a wireless communication provider may have a multi-band wireless network including a voice network operating in the 800 MHz spectrum and a voice network operating in the personal communication service (PCS) spectrum (i.e., 1850 MHz-1990 MHz). Currently, mechanisms exist to modify the frequency bands at which wireless communication devices operate within a multi-band wireless network. However, these mechanisms currently lack the ability to intelligently manage these wireless communication devices.

OVERVIEW

A wireless control system for managing traffic in a multi-band wireless network is disclosed. The wireless control system receives measurements that indicate channel performance information and round trip delay information for wireless communication devices operating within a first frequency band of the multi-band wireless network, process the channel performance information and the round trip delay information to determine a probability of successful frequency transfer, identify a subset of the wireless communication devices with probabilities of successful transfer that exceed a transfer threshold, and remove from the subset these wireless communication devices whose velocity exceeds a movement threshold. The wireless control system also receives loading information for the first frequency band, processes the loading information to determine if the loading information exceeds an offload threshold, and if so then identifies a first wireless communication device from the modified subset of the plurality of wireless communication devices and transfers an instruction to modify an operating frequency of the first wireless communication device from the first frequency band to the second frequency band.

DETAILED DESCRIPTION

The following description and associated drawings teach the best mode of the invention. For the purpose of teaching inventive principles, some conventional aspects of the best mode may be simplified or omitted. The following claims specify the scope of the invention. Some aspects of the best mode may not fall within the scope of the invention as specified by the claims. Thus, those skilled in the art will appreciate variations from the best mode that fall within the scope of the invention. Those skilled in the art will appreciate that the features described below can be combined in various ways to form multiple variations of the invention. As a result, the invention is not limited to the specific examples described below, but only by the claims and their equivalents.

Figure 1:
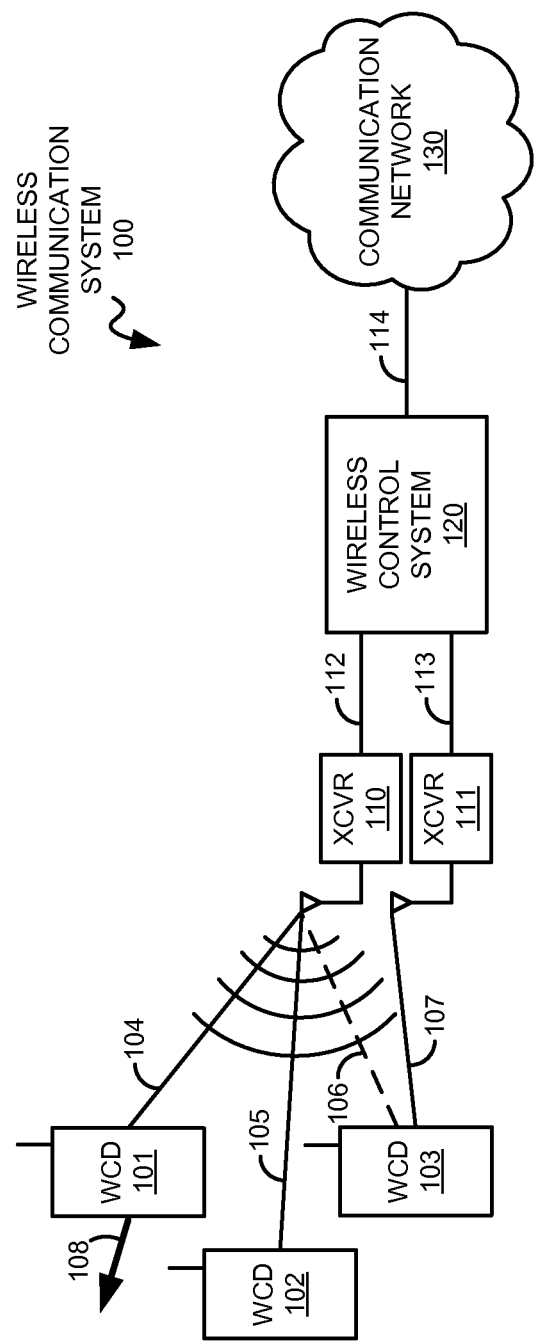
FIG. 1 illustrates a wireless communication system for managing traffic in a multi-band wireless network.

FIG. 1 illustrates wireless communication system 100 for managing traffic in a multi-band wireless network. Wireless communication system 100 includes wireless communication devices 101-103, wireless communication links 104-107, motion vector 108, transceivers 110-111, communication links 112-114, and communication network 130.

Wireless communication devices 101-103 and transceiver 110 communicate over respective wireless communication links 104-106. Wireless communication device 103 and transceiver 111 communicate over wireless communication link 107. Transceiver 110 and wireless control system 120 communicate over communication link 112. Transceiver 111 and wireless control system 120 communicate over communication link 113. Wireless control system 120 and communication network 130 communicate over communication link 114. It is appreciated that more or fewer wireless communication devices may be included in wireless communication system 100.

In operation, transceiver 110 operates within a first frequency band and transceiver 111 operates within a second frequency band of the multi-band wireless network. Wireless control system 120 communicates with transceiver 110 to determine whether the first frequency band of the multi-band wireless network is overloaded, and if so, then wireless control system 120 identifies one or more appropriate wireless communication devices to move from the first frequency band of the multi-band wireless network to the second frequency band of the multi-band wireless network until the loading threshold is no longer exceeded in the first frequency band of the multi-band wireless network. Wireless control system 120 identifies the appropriate wireless communication devices based on a number of criteria such as loading information of the first frequency band, performance information of the wireless communication devices, round trip delay information, and past or present movement of the wireless communication devices.

Figure 2:
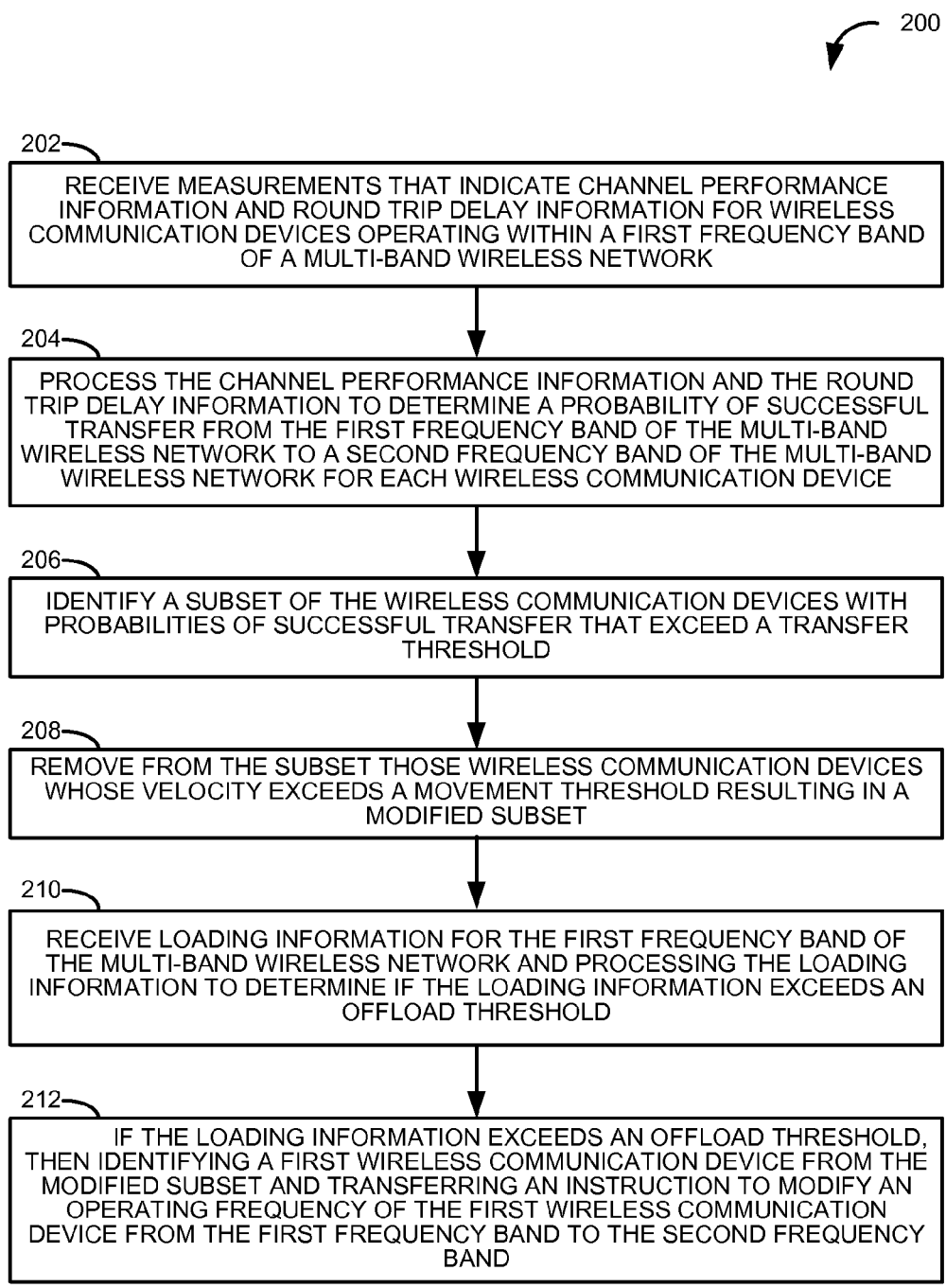
FIG. 2 illustrates operation of a wireless control system in a wireless communication system for managing traffic in a multi-band wireless network.

FIG. 2 illustrates operation of wireless control system 120 in wireless communication system 100 for managing traffic in the multi-band wireless network. In this example, transceiver 110 is initially in communication with wireless communication devices 101-103 and wireless control system 120. Wireless control system 120 determines that a first frequency band of the multi-band wireless network is overloaded, and thus identifies one of the wireless communication devices operating within the first frequency band (i.e., wireless communication devices 101-103) to transfer to a second frequency band of the multi-band wireless network.

To begin, wireless control system 120 receives measurements that indicate channel performance information and round trip delay information for a plurality of wireless communication devices operating within a first frequency band of a multi-band wireless network (202). For example, wireless communication devices 101-103 may measure the signal strength of the pilot channel in the first frequency band. The measurement or signal strength may be illustrated by, for example, a received signal strength indicator (RSSI) measurement. Wireless communication devices 101-103 may communicate these measurements of channel performance information to transceiver 110 via respective wireless communication links 104-106 using messages such as, for example, real pilot strength measurement messages (PSMMs) which are typically collected in a code division multiple access (CDMA) networks.

Transceiver 110 receives the channel performance information from wireless communication devices 101-103 and relays this information to wireless control system 120 over communication link 112. Round trip delay (RTD) information or round trip time information (RTT) is also transferred over communication link 112. RTD information is the length of time it takes for a signal, such as a ping signal, to be sent plus the length of time it takes for an acknowledgment of that signal to be received. It is appreciated that the round trip delay information may also be determined in whole or in part at wireless control system 120.

Wireless control system 120 processes the channel performance information and the round trip delay information to determine a probability of successful transfer from the first frequency band of the multi-band wireless network to a second frequency band of the multi-band wireless network for each of the plurality of wireless communication devices (204). The probability of successful transfer may be an estimate of communication performance for the wireless communication device at the second frequency band. For example, wireless control system 120 may process the channel performance information and the round trip delay information and determine probabilities of successful transfer for wireless communication devices 101-103.

Wireless control system 120 then identifies a subset of the plurality of wireless communication devices with probabilities of successful transfer that exceed a transfer threshold (206). In this example, wireless control system 120 uses the probabilities of successful transfer to determine that wireless communication devices 101 and 103 will likely perform best within the second frequency band, and thus wireless communication devices 101 and 103 are included in the subset of the plurality of wireless communication devices.

Once the subset of the plurality of wireless communication devices is identified, wireless control system 120 selectively removes from the subset of the plurality of wireless communication devices those wireless communication devices whose velocity exceeds a movement threshold resulting in a modified subset (208). In one example, velocity and movement information is provides by the wireless communication devices 101-103 over respective wireless communication links 104-106. Alternatively or additionally, the velocity and/or movement information may be determined in whole or in part by transceivers 110 and 111 and wireless control system 120. In this example wireless control system 120 recognizes that wireless communication device 101 is moving away from transceiver 110 at a speed identified by motion vector 108, and thus wireless control system 120 removes wireless communication device 101 from the subset of the wireless communication devices.

Wireless control system 120 receives loading information for the first frequency band of the multi-band wireless network and processes the loading information to determine if the loading information exceeds an offload threshold (210). Wireless control system 120 may receive loading information periodically, continuously, based on specified events, or the like. It is appreciated that the loading information may be received by wireless control system 120 prior to, with, and/or after receiving the channel performance information and/or round trip delay information. In this example loading information for the first frequency band of the multi-band wireless network may be determined in whole or in part by transceiver 110 and/or wireless control system 120. Once received, wireless control system 120 processes the loading information to determine if the first frequency band is overloaded by comparing the loading information to an offload threshold.

Lastly, if the loading information exceeds the offload threshold, then wireless control system 120 identifies a first wireless communication device from the modified subset of the plurality of wireless communication devices and transfers an instruction to modify an operating frequency of the first wireless communication device from the first frequency band to the second frequency band (212). For example, wireless control system 120 may identify the wireless communication device with the highest probability of successful transfer from the first frequency band to the second frequency band. In this case, wireless control system 120 identifies wireless communication device 103 because it is the only wireless communication device in the modified subset.

Figure 3:
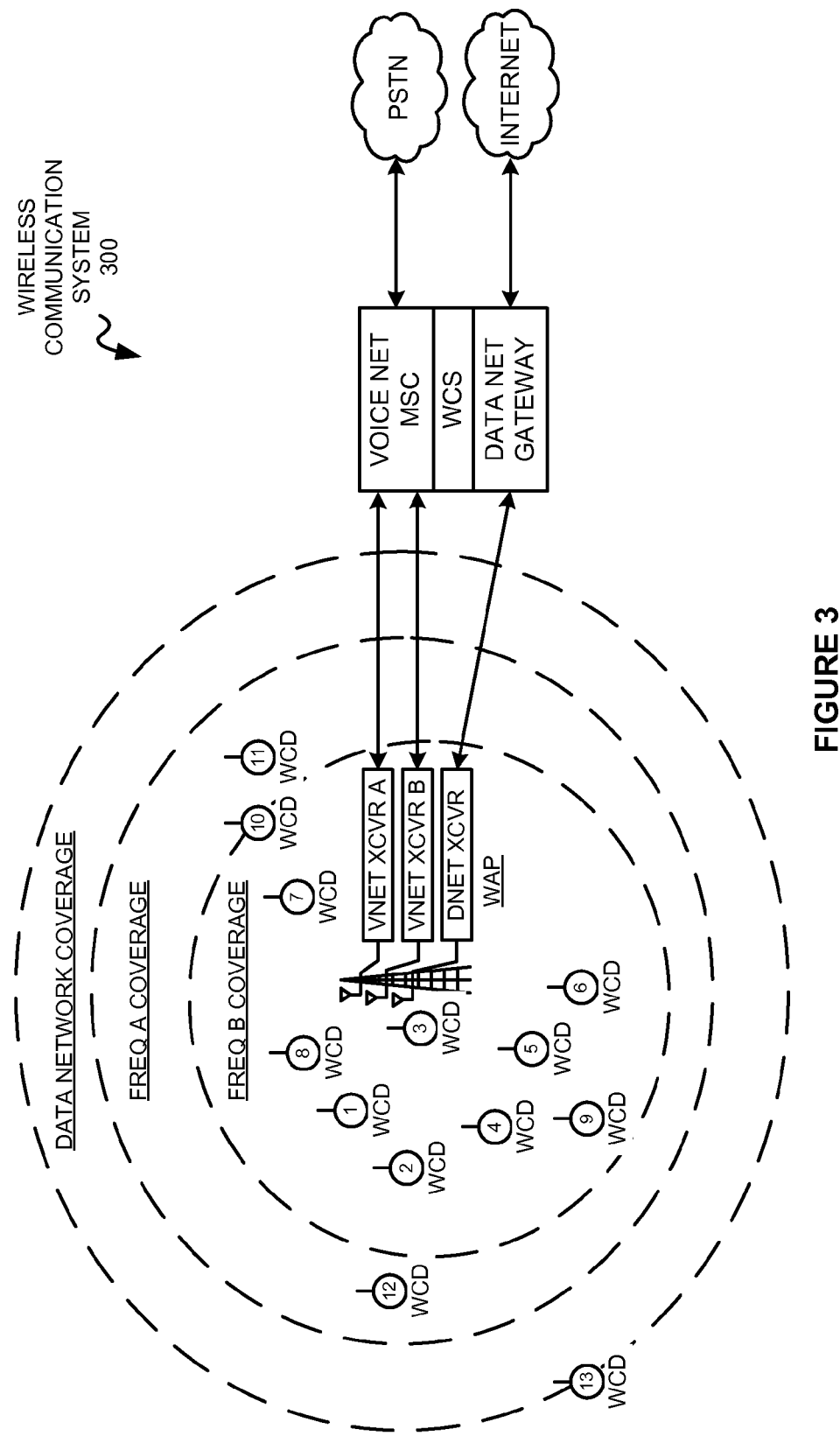
FIG. 3 illustrates a wireless communication system for managing traffic in a multi-band wireless network

FIG. 3 illustrates wireless communication system 300 for managing traffic in a multi-band wireless network. Wireless communication system 300 includes wireless communication devices 1-13, a wireless access point, a wireless voice network, a wireless data network, and a wireless control system (WCS). The wireless voice network includes voice network transceiver A, voice network transceiver B, voice network mobile switching station (MSC), and public switched telephone network (PSTN). The wireless data network includes a data network transceiver, a data network gateway, and a data communication network (INTERNET). It is appreciated that WCS may be a discrete system, an element of the voice network in whole or in part, and/or an element of the data network in whole or in part.

Although the wireless data network and the wireless voice network share the wireless access point, the wireless data network and each band of the wireless voice network are discrete systems with separate transceivers and antennas at each access point. Thus, the data network and each band of the voice network has radio frequency circuitry mounted on the same physical structure. The wireless data network provides packet access to the Internet and to other data systems, such as email systems, media servers, and the like. The wireless voice network provides voice calling and text messaging. Although other network types could be used, the wireless voice network could be a Code Division Multiple Access (CDMA) 1× telephony network and the data network could be an Evolution Data-Only (EVDO) Internet access network.

As shown, the data network covers the largest geographical area followed by frequency band A of the wireless voice network, and then frequency band B of the wireless voice network. A wireless communication provider provides voice services to customers in both frequency band A and frequency band B. In this example, frequency band B of the wireless voice network is higher in the frequency spectrum than frequency band A of the wireless voice network. For instance, frequency band A may be in the 800 MHz band and frequency band B may be in the personal communication service (PCS) spectrum (i.e., 1850 MHz-1990 MHz).

In operation, the wireless communication devices initially default to operate within the first frequency band of the multi-band wireless network. Thus, in this example, wireless communication devices 1-12 operate within frequency band A of the wireless voice network. Wireless communication device 13 is not within range of frequency band A or B, and thus cannot communicate with the wireless access point via frequency band A or B of the wireless voice network.

The wireless control system communicates with voice network transceiver A to determine whether the frequency band A of the multi-band wireless network is overloaded, and if so, then the wireless control system identifies one or more appropriate wireless communication devices to move from the first frequency band of the multi-band wireless network to the second frequency band of the multi-band wireless network until the loading threshold is no longer exceeded in the frequency band A of the multi-band wireless network.

Figure 4:
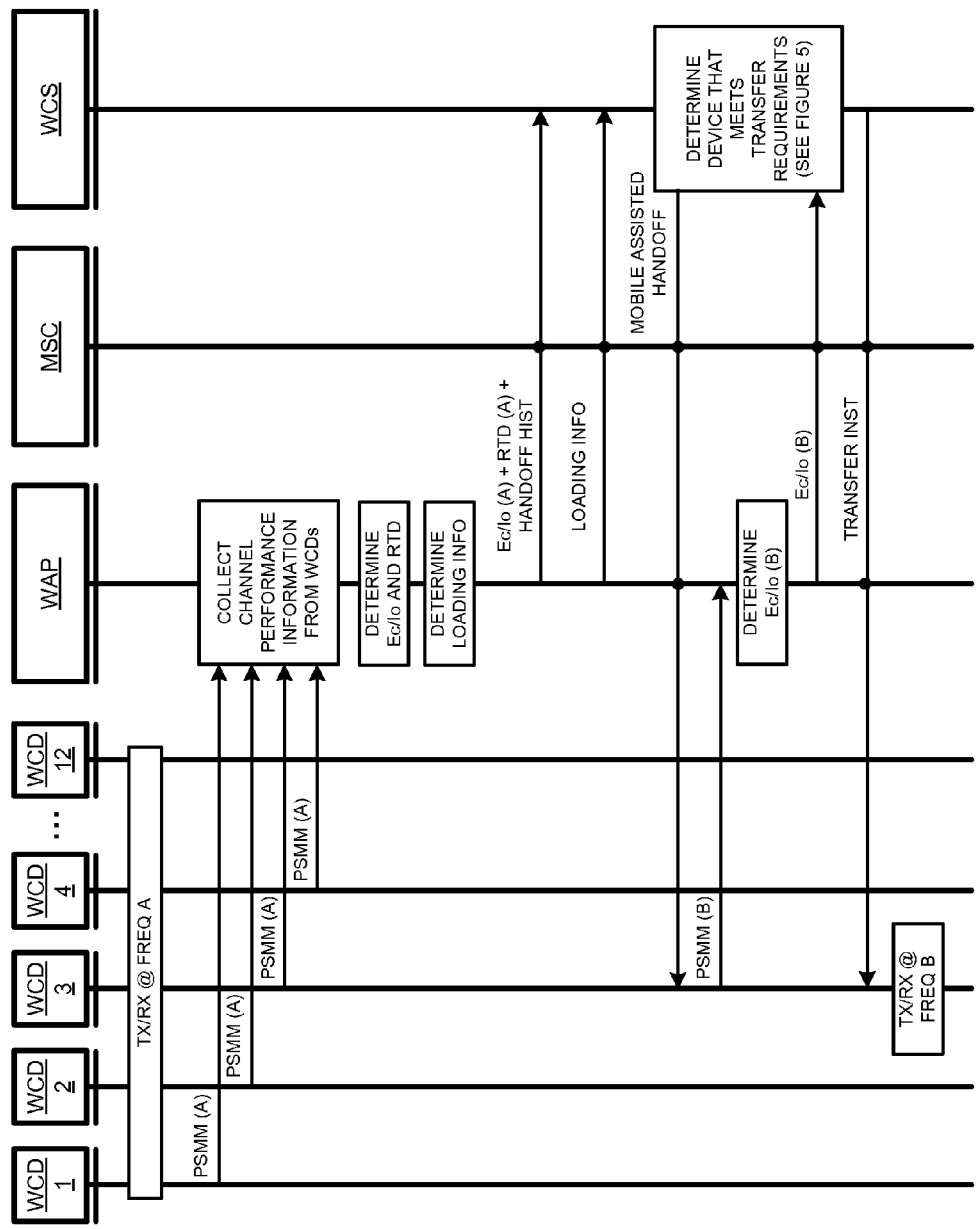
FIG. 4 illustrates a sequence of operations of a wireless communication system for managing traffic in a multi-band wireless network.

FIG. 4 illustrates a sequence of operations in wireless communication system 300 for managing traffic in the multi-band wireless network. To begin, wireless communication devices 1-12 initially communicate with the wireless access point within voice frequency band A. In this example, wireless communication devices 1-12 measure the signal strength of the pilot channel signal within frequency band A. The measurement or signal strength may be illustrated by, for example, a received signal strength indicator (RSSI) measurement. Typically, a pilot channel comprises a fixed power signal commonly known as a "pilot" or "control channel" signal. The pilot channel or pilot signal may serve to define the boundaries of the cell or sector area served by a base station. Moreover, in some instances the pilot signal may also provide for time reference and for amplitude and phase tracking and allows wireless communication devices to identify and become synchronized with the various base stations that are within range of their communication capability. Additionally, wireless communication devices within range use the pilot signal to register with a base station (or tower).

Wireless communication devices 1-12 communicate the measurements of channel performance information to the wireless access point via one or more real pilot strength measurement messages (PSMMs). It is appreciated that the PSMMs may be transmitted to the wireless access point periodically, continuously, and/or based on a request or an event. The wireless access point collects the PSMMs which indicate the channel performance information for each of wireless communication devices 1-12 and processes the messages to determine an Ec/Io and round trip delay (RTD) information for each of wireless communication devices 1-12. The round trip delay information typically comprises an indication of the amount of time required to transfer a message to the wireless communication device and receive a response to that message from the wireless communication device. It is appreciated that in some cases the Ec/Io and RTD information may be determined in whole or in part by the wireless control system.

The Ec/Io is a notation used to represent a dimensionless ratio of the average power of a channel (expressed in dB), typically the pilot channel, to the total signal power. The pilot channel power is always less than the total cell power, and thus the ratio of the pilot power or effect energy (Ec) to the total cell power or total energy and noise (Io) is always less than one. Accordingly, when measured in decibels, the value of Ec/Io is negative. Equation 1 (below) illustrates the calculation.

$$Ec/Io = 10 \cdot \log [\text{Effect energy}/(\text{total energy}+\text{noise})]$$
$$< 10 \cdot \log(1) = 0 \quad \text{EQUATION 1}$$

The wireless access point also determines loading information for frequency band A of the wireless voice network. The loading information may comprise one or more of available forward link power, reverse noise, backhaul capacity, and/or slot utilization. It is appreciated that other metrics, measurements, and/or observation may also be used in determining the loading information for frequency band A.

The wireless access point then transfers the loading information for frequency band A of the wireless voice network and the Ec/Io to the mobile switching station (MSC) which relays this information to the wireless control system (WCS). It is appreciated that the Ec/Io and the loading information for frequency band A of the wireless voice network may be transferred together or separately to the mobile switch station or directly to the wireless communication system. The Ec/Io and/or the loading information for frequency band A of the wireless voice network may be transferred by the wireless access point periodically, continuously, based on specified events or updates, or the like.

Once the wireless control system receives the Ec/Io and the loading information for frequency band A of the wireless voice network, the wireless control system then determines whether frequency band A of the wireless voice network is overloaded, and if so, identifies one or more appropriate wireless communication devices to handoff from frequency band A of the wireless voice network to frequency band B of the wireless voice network until a loading threshold on frequency band A is no longer exceeded. Identifying the appropriate device(s) is discussed in more detail with respect to FIG. 5.

Nonetheless, when a wireless communication device is identified to handoff from frequency band A of the wireless voice network to frequency band B of the wireless voice network, a mobile assisted handoff signal is transferred to the identified wireless communication device. In response, the wireless control system receives measurements that indicate channel performance information for the wireless communication device when operating within frequency band B of the wireless voice network. The measurements are ultimately used as a final determinative factor as to whether to handoff the wireless communication device from frequency band A of the wireless voice network to frequency band B of the wireless voice network.

In this example, wireless communication device 3 is identified as an appropriate candidate to handoff or transfer from frequency band A of the wireless voice network to frequency band B of the wireless voice network, and thus wireless control system transfers a mobile assisted handoff message that is received by the wireless access point and transmitted to wireless communication device 3. Wireless communication device 3 receives the message and responsively measures the signal strength of the pilot channel from frequency band B. The measurement or signal strength may be illustrated by, for example, a received signal strength indicator (RSSI) measurement. Wireless communication device 3 then communicates these measurements of channel performance information to the wireless access point using one or more PSMMs.

The wireless access point receives the PSMM measuring the signal strength of the pilot channel from frequency band B measured at wireless communication device 3 and processes the PSMM to determine the Ec/Io. The wireless access point subsequently transfers the Ec/Io to the wireless control system. The wireless control system uses the Ec/Io indicating the signal strength of the pilot channel from frequency band B measured at wireless communication device 3 to confirm the handoff. The wireless control system subsequently transfers an instruction to modify the operating frequency of wireless communication device 3 from frequency band A to frequency band B. The instruction is received by the MSC and the wireless access point and transmitted to wireless communication device 3, which in response to receiving the instruction, modifies its operating frequency.

Figure 5:
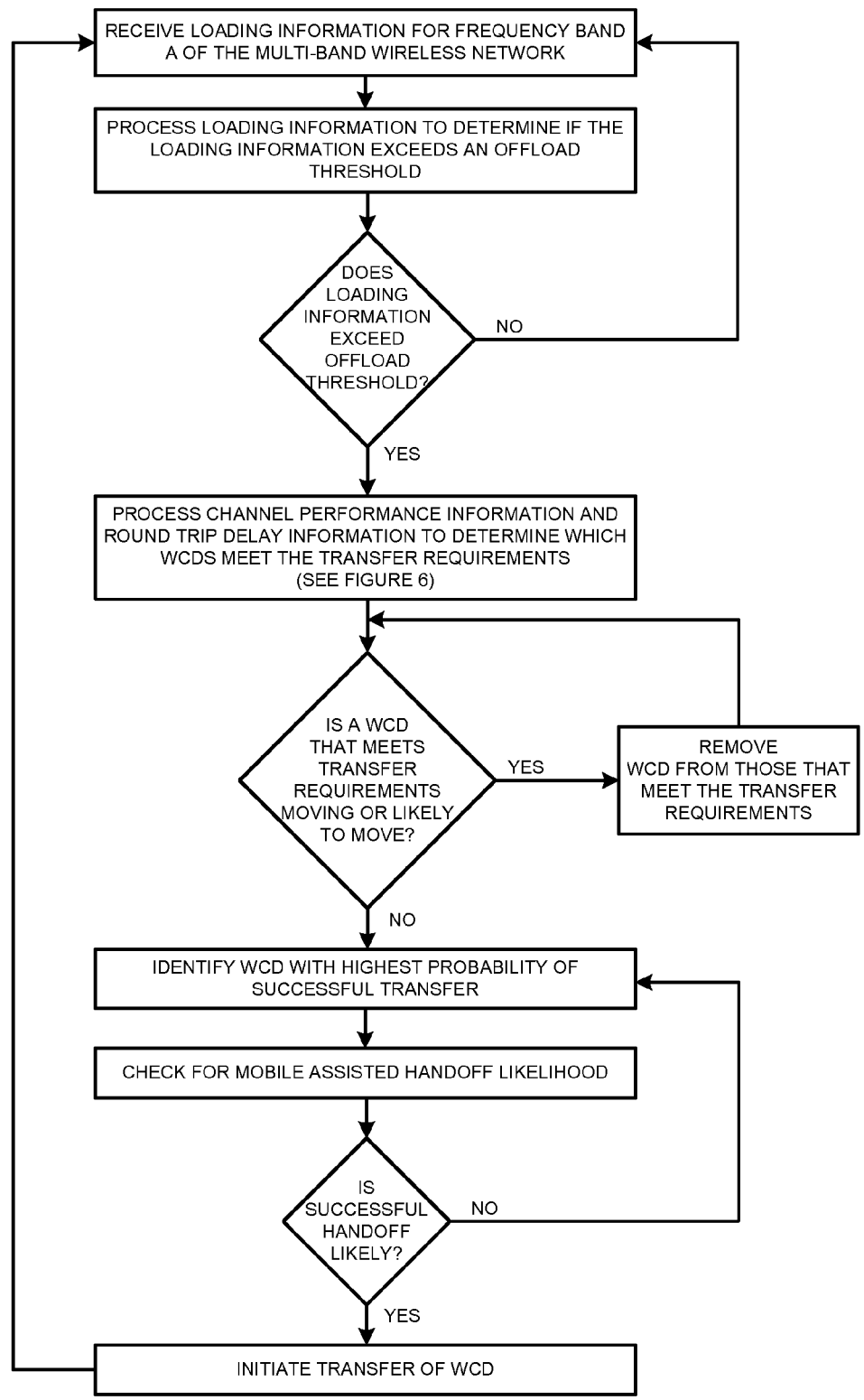
FIG. 5 illustrates operation of a wireless control system in a wireless communication system for managing traffic in a multi-band wireless network.

FIG. 5 illustrates operation of the wireless control system in wireless communication system 300 for managing traffic in the multi-band wireless network. In particular, FIG. 5 the process of identifying or determining which wireless communication device(s) meet the transfer requirements. To begin, the wireless control system receives loading information for frequency band A of the multi-band wireless network. As discussed, the loading information may comprise one or more of available forward link power, reverse noise, backhaul capacity, and/or slot utilization. It is appreciated that other metrics, measurements, and/or observation may also be used in determining the loading information for frequency band A.

The wireless control system then processes the loading information to determine if the loading information exceeds an offload threshold. The offload threshold may be set to a value such that frequency band A does not become overloaded or bogged down by the number of wireless communication devices operating within frequency band A. If the offload threshold is not exceeded then the wireless control system does returns to receiving the loading information.

However, if the loading information does exceed the offload threshold then the wireless control system processes the channel performance information and round trip delay information (see FIG. 4) to determine which wireless communication devices meet the transfer requirements. For example, the wireless control system may process performance information and round trip delay information to determine a probability or likelihood of successful transfer from frequency band A to frequency band B for each of the wireless communication devices.

In order to determine this probability or likelihood of successful transfer, the wireless control system may process multiple Ec/Io (A) values and multiple round trip delay values as a function of time for each wireless communication device. In one example of operation, the wireless control system determines the maximum Ec/Io (A) and the minimum round trip delay for each of the plurality of wireless communication devices operating within frequency A. The wireless control system then normalizes the maximum Ec/Io (A) and the minimum round trip delay information for each wireless communication device in order to process the information together and determines the likelihood of successful transfer (Z). If Z is greater or equal to a transfer or handoff threshold than the wireless communication device meets the transfer requirements. Equation 2 (below) illustrates the calculation of the likelihood of successful transfer where X and Y are the respective weighted factors for the maximum normalized Ec/Io and minimum normalized round trip delay.

$$Z = X[\max Ec/Io(\text{normalized})] + Y[\min RTD(\text{normalized})] \quad \text{EQUATION 2}$$

Figure 6:
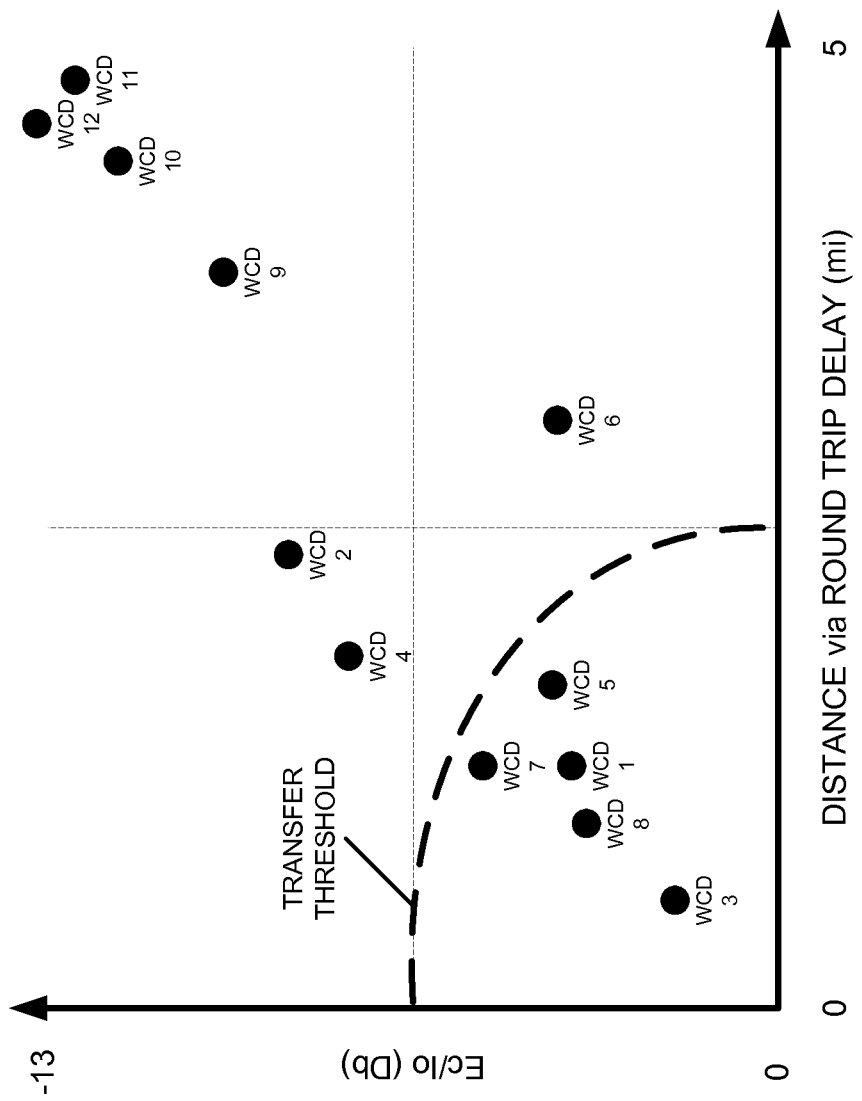
FIG. 6 illustrates a graph presenting average power of a channel versus round trip delay.

A graph illustrating average power of a channel versus round trip delay is presented in FIG. 6. In particular, the graph illustrates the determined value Z for each of wireless communication devices 1-10. The x-axis represents DISTANCE via round trip delay in miles and the y-axis represents the Ec/Io in decibels. As shown, wireless communication devices 1, 3, 5, 7, and 8 are a subset of the wireless communication devices with values of Z that meet or exceed the transfer threshold, and thus meet the transfer requirements. Conversely, the wireless communication devices shown outside of the transfer threshold do not meet the transfer requirements. For example, wireless communication device 10 is the furthest wireless communication device of the wireless communication devices shown in FIG. 3 that is still in communication with voice transceiver A. Accordingly, the graph illustrates wireless communication device 10 almost five miles from the transceiver and having an average power (Ec/Io) measurement of almost negative thirteen decibels.

Referring back to FIG. 5, once the subset of wireless communication devices that meet the transfer threshold are determined, the wireless control system then removes from the subset those wireless communication devices that are moving or are likely to move. Wireless communication devices that are moving at or above a defined threshold speed are removed from the subset. Likewise, in some examples, the wireless control system may also remove wireless communication devices based on their handoff history. For example, a wireless communication device that has been handed off recently or frequently has a higher likelihood to be handed off again, and thus the wireless communication device may be removed from the subset of wireless communication devices that meet the transfer requirements.

The wireless control system then identifies a wireless communication device with the highest likelihood or probability of successful transfer from the frequency band A to frequency band B of the multi-band wireless network. The wireless communication device is identified from the subset of wireless communication devices that meet or exceed the transfer threshold. In this example, wireless communication device 3 is identified as the wireless communication device with the highest likelihood or probability of successful transfer from the frequency band A to frequency band B of the multi-band wireless network (see FIG. 6).

Once the wireless communication device with the highest likelihood or probability of successful transfer is identified, the wireless control system then checks for mobile assisted handoff likelihood. Checking the mobile assisted handoff likelihood may include initiating a mobile assisted hard handoff of the identified wireless communication device with the highest likelihood or probability of successful transfer from the frequency band A to frequency band B of the multi-band wireless network (based on measurements at the wireless communication device). Initiating the mobile assisted hard handoff includes transferring a message from the wireless control system to the wireless access point for delivery to the wireless communication device. The message directs the wireless communication device to measure or otherwise make a determination of the signal strength or channel performance of frequency band B.

In this example, wireless communication device 3 receives the message and measures the signal strength of the pilot channel within frequency band B. Wireless communication device 3 then communicates this measurement of channel performance information to the wireless access point via a PSMM. The wireless access point processes the PSMM and transfers an Ec/Io indicating the channel conditions of frequency band B as measured from wireless communication device 3 (see FIG. 4). If the measurement is above a power threshold (successful handoff likely—based on real measurements) then a transfer of wireless communication device 3 is initiated. Otherwise, the wireless control system identifies the next wireless communication device with the next highest likelihood or probability of successful transfer and attempts to hand off that wireless communication device. The process is completed until the loading information no longer exceeds the offload threshold.

Figure 7:
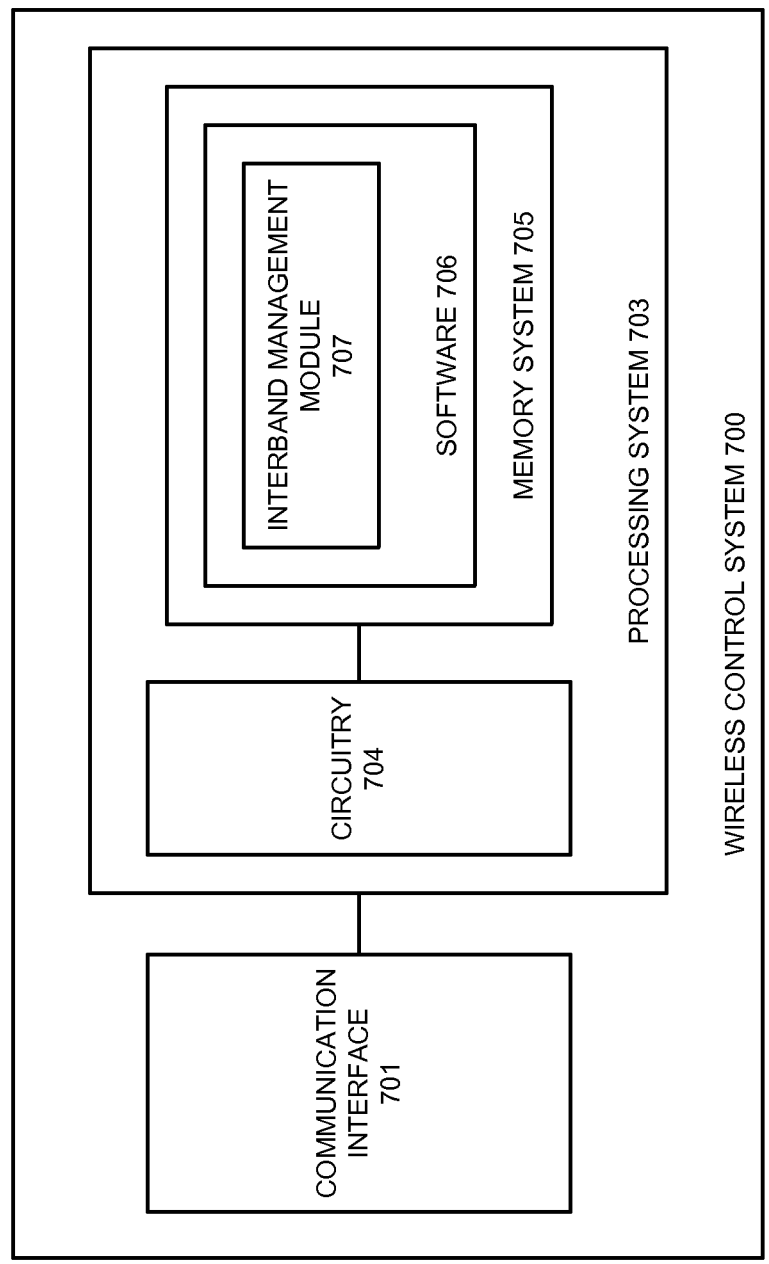
FIG. 7 illustrates a wireless control system for managing traffic in a multi-band wireless network.

FIG. 7 illustrates wireless control system 700 for managing traffic in a multi-band wireless network. Wireless control system 700 provides an example of wireless control system 120 of FIG. 1 and the wireless control system of FIG. 3, although these systems may use alternative configurations. Wireless control system 700 comprises communication interface 701 and a processing system 703. Processing system 703 is linked to communication interface 701. Processing system 703 includes processing circuitry 704 and memory system 705 that stores operating software 706. Operating software 706 comprises software module 707.

Communication interface 701 includes a network router and/or gateway equipment for communicating with access and/or communication networks of a wireless communication system, such as with communication network 120 and transceivers 110 and 111 of FIG. 1. Communication interface 701 exchanges communications with a wireless communication system over a link to provide communication services, omitted for clarity. The link could use various protocols or communication formats as described herein, including combinations, variations, or improvements thereof.

Processing circuitry 704 comprises microprocessor and other circuitry that retrieves and executes operating software 706 from memory system 705. Processing circuitry 704 may comprise single device or be distributed across multiple devices—including devices in different geographic areas. Processing circuitry 704 may be embedded in various types of equipment.

Memory system 705 comprises a non-transitory storage medium, such as a disk drive, flash drive, data storage circuitry, or some other memory apparatus. Memory system 705 may comprise single device or be distributed across multiple devices—including devices in different geographic areas. Memory system 705 may be embedded in various types of equipment.

Operating software 706 comprises computer programs, firmware, or some other form of machine-readable processing instructions. Operating software 706 may include an operating system, utilities, drivers, network interfaces, applications, or some other type of software. In this example, operating software 706 also comprises software module 707, although software 706 could have alternative configurations. When executed by processing circuitry 704, operating software 706 directs processing system 703 to operate as described herein to manage traffic in a multi-band wireless network.

In particular, when executed by a wireless control system, interband management module 707 directs the data control system to receive measurements that indicate channel performance information and round trip delay information for a plurality of wireless communication devices operating within a first frequency band of a multi-band wireless network, process the channel performance information and the round trip delay information to determine a probability of successful transfer from the first frequency band of the multi-band wireless network to a second frequency band of the multi-band wireless network for each of the plurality of wireless communication devices, identify a subset of the plurality of wireless communication devices with probabilities of successful transfer that exceed a transfer threshold, remove from the subset of the plurality of wireless communication devices those wireless communication devices whose velocity exceeds a movement threshold resulting in a modified subset, receive loading information for the first frequency band of the multi-band wireless network and processing the loading information to determine if the loading information exceeds an offload threshold, and if the loading information exceeds the offload threshold, then identify a first wireless communication device from the modified subset of the plurality of wireless communication devices and transferring an instruction to modify an operating frequency of the first wireless communication device from the first frequency band to the second frequency band.

Referring back to FIG. 1, wireless communication devices 101-103 comprise Radio Frequency (RF) communication circuitry and an antenna. The RF communication circuitry typically includes an amplifier, filter, modulator, and signal processing circuitry. Wireless communication devices 101-103 may also include a user interface, memory device, software, processing circuitry, or some other communication components. Each of wireless communication devices 101-103 could be a telephone, transceiver, mobile phone, cellular phone, smartphone, computer, personal digital assistant (PDA), e-book, game console, mobile Internet device, wireless network interface card, media player, or some other wireless communication apparatus—including combinations thereof. Wireless network protocols that may be utilized by wireless communication devices 101-103 include Code Division Multiple Access (CDMA) 1xRTT, Global System for Mobile communications (GSM), Universal Mobile Telecommunications System (UMTS), High-Speed Packet Access (HSPA), Evolution-Data Optimized (EV-DO), EV-DO rev. A, Third Generation Partnership Project Long Term Evolution (3GPP LTE), Worldwide Interoperability for Microwave Access (WiMAX), IEEE 802.11 protocols (Wi-Fi), Bluetooth, Internet, telephony, or any other wireless network protocol that facilitates communication between wireless communication devices 101-103 and transceivers 110-111.

A wireless access points (not shown) typically comprises a geographic site that includes communications equipment and facilities. The wireless access point also includes mounting structures, power supplies, shelters, and network equipment. The network equipment includes transceivers 110-111. Transceivers 110-111 each comprise RF communication circuitry and antennas located at the wireless access point. Some examples of wireless access points include a base transceiver station (BTS), base station controller (BSC), radio base station (RBS), Node B, enhanced Node B (eNode B), and others. The RF communication circuitry typically includes amplifiers, filters, RF modulators, and signal processing circuitry and software.

Wireless control system 120 comprises a processing system and communication transceiver. The processing system includes circuitry, memory, and software. Wireless control system 120 may also include other components such as a router, server, data storage system, and power supply. Wireless control system 120 may reside in a single device or may be distributed across multiple devices. Wireless control system 120 may be a discrete system or may be integrated within other systems—including other systems within wireless communication system 100.

Communication network 130 comprises routers, servers, memory devices, software, processing circuitry, cabling, power supplies, network communication interfaces, and structural supports. Wireless network protocols that may be utilized by communication network 130 includes CDMA, GSM, UMTS, HSPA, EV-DO, EV-DO rev. A, 3GPP LTE, WiMAX, Wi-Fi, Bluetooth, Internet, telephony, or some other communication format—including combinations thereof.

Wireless communication links 104-107 use the air or space as the transport medium. Wireless communication links 104-107 may use various protocols, such as CDMA, GSM, UMTS, HSPA, EV-DO, EV-DO rev. A, 3GPP LTE, WiMAX, Wi-Fi, Bluetooth, Internet, telephony, or some other communication format—including combinations thereof. Wireless communication links 104-107 may comprise many different signals sharing the same link. For example, wireless communication links 104-107 could include multiple signals operating in a single propagation path comprising multiple communication sessions, frequencies, timeslots, transportation ports, logical transportation links, network sockets, IP sockets, packets, or communication directions—including combinations thereof.

Communication links 112-114 use metal, air, space, optical fiber such as glass or plastic, or some other material as the transport medium—including combinations thereof. Communication links 112-114 could use various communication protocols, such as TDM, IP, Ethernet, telephony, optical networking, hybrid fiber coax (HFC), communication signaling, wireless protocols, or some other communication format—including combinations thereof. Communication links 112-114 may be direct links or could include intermediate networks, systems, or devices.

The above description and associated figures teach the best mode of the invention. The following claims specify the scope of the invention. Note that some aspects of the best mode may not fall within the scope of the invention as specified by the claims. Those skilled in the art will appreciate that the features described above can be combined in various ways to form multiple variations of the invention. As a result, the invention is not limited to the specific embodiments described above, but only by the following claims and their equivalents.

What is claimed is:

1. A method of operating a wireless control system, the method comprising:
receiving measurements that indicate channel performance information and round trip delay information for a plurality of wireless communication devices operating within a first frequency band of a multi-band wireless network;
processing the channel performance information and the round trip delay information to determine a probability of successful transfer from the first frequency band of the multi-band wireless network to a second frequency band of the multi-band wireless network for each of the plurality of wireless communication devices by at least normalizing a maximum ratio of effect energy to total energy and noise (Ec/Io) and a minimum round trip delay and calculating a weighted sum of the normalized maximum Ec/Io and the normalized minimum round trip delay for each of the plurality of wireless communication devices;
identifying a subset of the plurality of wireless communication devices with probabilities of successful transfer that exceed a transfer threshold;
removing from the subset of the plurality of wireless communication devices those wireless communication devices whose velocity exceeds a movement threshold resulting in a modified subset;
receiving loading information for the first frequency band of the multi-band wireless network and processing the loading information to determine if the loading information exceeds an offload threshold; and
if the loading information exceeds the offload threshold, then identifying a first wireless communication device from the modified subset of the plurality of wireless communication devices and transferring an instruction to modify an operating frequency of the first wireless communication device from the first frequency band to the second frequency band.

2. The method of claim 1 wherein the second frequency band is higher in a frequency spectrum than the first frequency band.

3. The method of claim 1 wherein identifying a subset of the plurality of wireless communication devices comprises identifying each of the plurality of wireless communication devices with weighed sums that exceed the transfer threshold.

4. The method of claim 1 further comprising receiving a handoff history for a wireless communication device of the subset of the plurality of wireless communication devices, processing the handoff history for the wireless communication device to determine whether the wireless communication device has a recent history of handoffs, and if the wireless communication device has the recent history of handoffs, then removing the wireless communication device from the subset of the plurality of wireless communication devices.

5. The method of claim 1 wherein identifying the first wireless communication device from the modified subset of the plurality of wireless communication devices comprises initiating a mobile assisted hard handoff of the first wireless communication device, and in response, receiving a measurement that indicates channel performance information for the first wireless communication device in the second frequency band of the multi-band wireless network.

6. The method of claim 5 wherein identifying the first wireless communication device from the modified subset of the plurality of wireless communication devices comprises selecting the first wireless communication device if the measurement that indicates channel performance information for the first wireless communication device in the second frequency band exceeds a power threshold.

7. The method of claim 1 wherein the loading information for the first frequency band of the multi-band wireless network comprises one or more of available forward link power, reverse noise, backhaul capacity, and slot utilization.

8. A wireless control system comprising:
an interface configured to receive measurements that indicate channel performance information and round trip delay information for a plurality of wireless communication devices operating within a first frequency band of a multi-band wireless network, and receive loading information for the first frequency band of the multi-band wireless network; and
a processing system configured to process the channel performance information and the round trip delay information to determine a probability of successful transfer from the first frequency band of the multi-band wireless network to a second frequency band of the multi-band wireless network for each of the plurality of wireless communication devices by at least normalizing a maximum ratio of effect energy to total energy and noise (Ec/Io) and a minimum round trip delay and calculating a weighted sum of the normalized maximum Ec/Io and the normalized minimum round trip delay for each of the plurality of wireless communication devices;
the processing system further configured to identify a subset of the plurality of wireless communication devices with probabilities of successful transfer that exceed a transfer threshold, and remove from the subset of the plurality of wireless communication devices those wireless communication devices whose velocity exceeds a movement threshold resulting in a modified subset;
the processing system further configured to process the loading information to determine if the loading information exceeds an offload threshold, and if the loading information exceeds an offload threshold, then identify a first wireless communication device from the modified subset of the plurality of wireless communication devices and transfer an instruction to modify an operating frequency of the first wireless communication device from the first frequency band to the second frequency band.

9. The wireless control system of claim 8 wherein the second frequency band is higher in a frequency spectrum than the first frequency band.

10. The wireless control system of claim 8 wherein to identify the subset of the plurality of wireless communication devices, the processing system is configured to identify each of the plurality of wireless communication devices with weighed sums that exceed the transfer threshold.

11. The wireless control system of claim 8 wherein the interface is further configured to receive a handoff history for a wireless communication device of the subset of the plurality of wireless communication devices, and the processing system is further configured to process the handoff history for the wireless communication device to determine whether the wireless communication device has a recent history of handoffs, and if the wireless communication device has the recent history of handoffs, then remove the wireless communication device from the subset of the plurality of wireless communication devices.

12. The wireless control system of claim 8 wherein to identify the first wireless communication device from the modified subset of the plurality of wireless communication devices, the processing system is configured to initiate a mobile assisted hard handoff of the first wireless communication device, and in response, receive a measurement that indicates channel performance information for the first wireless communication device in the second frequency band of the multi-band wireless network.

13. The wireless control system of claim 12 wherein to identify the first wireless communication device from the modified subset of the plurality of wireless communication devices, the processing system is configured to select the first wireless communication device if the measurement that indicates channel performance information for the first wireless communication device in the second frequency band exceeds a power threshold.

14. The wireless control system of claim 8 wherein the loading information for the first frequency band of the multi-band wireless network comprises one or more of available forward link power, reverse noise, backhaul capacity, and slot utilization.

15. A wireless communication system comprising:
a wireless access point configured to receive channel performance information transmitted by a plurality of wireless communication devices operating within a first frequency band of a multi-band wireless network, determine round trip delay information for each of the plurality of wireless communication devices, transfer measurements that indicate the channel performance information and the round trip delay information for each of the plurality of wireless communication devices, and determine and transfer loading information for the first frequency band of the multi-band wireless network; and a wireless control system configured to receive the measurements that indicate the channel performance information and round trip delay information for the plurality of wireless communication devices, process the channel performance information and the round trip delay information to determine a probability of successful transfer from the first frequency band to a second frequency band of the multi-band wireless network for each of the plurality of wireless communication devices by at least normalizing a maximum ratio of effect energy to total energy and noise (Ec/Io) and a minimum round trip delay and calculating a weighted sum of the normalized maximum Ec/Io and the normalized minimum round trip delay for each of the plurality of wireless communication devices;

the wireless control system further configured to identify a subset of the plurality of wireless communication devices with probabilities of successful transfer that exceed a transfer threshold, and remove from the subset of the plurality of wireless communication devices those wireless communication devices whose velocity exceeds a movement threshold resulting in a modified subset;

the wireless control system further configured to receive the loading information for the first frequency band, process the loading information to determine if the loading information exceeds an offload threshold, and if the loading information exceeds an offload threshold, then identify a first wireless communication device from the modified subset of the plurality of wireless communication devices and transfer an instruction to modify an operating frequency of the first wireless communication device from the first frequency band to the second frequency band.

* * * * *